United States Patent
Chang

(10) Patent No.: US 6,486,584 B2
(45) Date of Patent: Nov. 26, 2002

(54) STRUCTURE FOR PREVENTING FLAME OF ALTERNATOR FOR VEHICLE

(75) Inventor: Seung-Il Chang, Seoul (KR)

(73) Assignee: Valeo Mando Electrical Systems Korea Limited, Kyongsangbuk-do (KR)

(*) Notice: Subject to any disclaimer, the term of this patent is extended or adjusted under 35 U.S.C. 154(b) by 0 days.

(21) Appl. No.: 09/843,366

(22) Filed: Apr. 25, 2001

(65) Prior Publication Data

US 2002/0047465 A1 Apr. 25, 2002

(30) Foreign Application Priority Data

Apr. 27, 2000 (KR) .............................................. 00-22510

(51) Int. Cl.⁷ .............................................. H02K 13/00
(52) U.S. Cl. .......................................... 310/239; 310/88
(58) Field of Search ................................. 310/219, 220, 310/221, 238, 239, 88, 52, 56, 58, 59, 60 A

(56) References Cited

U.S. PATENT DOCUMENTS

| | | | | |
|---|---|---|---|---|
| 3,171,050 A | * | 2/1965 | Gordon ....................... 310/239 |
| 4,659,950 A | * | 4/1987 | Gotoh .......................... 310/59 |
| 4,959,576 A | * | 9/1990 | Horibe et al. ............... 310/232 |
| 5,296,772 A | * | 3/1994 | Bradfield et al. ........... 310/239 |
| 5,424,600 A | * | 6/1995 | Ishikawa et al. ............ 310/220 |
| 5,550,418 A | * | 8/1996 | Chung ........................ 310/232 |
| 6,294,856 B1 | * | 9/2001 | Ishida et al. ................ 310/232 |

* cited by examiner

Primary Examiner—Dang Dinh Le
(74) Attorney, Agent, or Firm—R. Neil Sudol; Henry Coleman; William Sapone

(57) ABSTRACT

The present invention relates to a structure for preventing a flame of an alternator for a vehicle which is capable of preventing an explosion due to the spark and a flame from being transferred to the engine room by forming the flowing path and discharging a fine dust of the brush without changing the structure of the brush assembly formed of a holder cap and a brush holder, Which are detachable. In the structure for preventing a flame of an alternator for a vehicle, the brush assembly includes a brush holder receiving a brush and a holder cap detachably engaged to the brush holder, and a first flow way is formed in an upper portion of the brush holder and the holder cap for passing through the air flown through an inlet hole formed in a sealing member, and a second flow way is formed at a side portion of the brush holder and the holder cap in an alternator for a vehicle which is formed of a brush assembly having a brush contacting with a slip ring inserted onto one end of a driving shaft installed in a front housing and a sealing member provided at a lower portion of the brush assembly, a flame prevention structure for an alternator of a vehicle.

3 Claims, 3 Drawing Sheets

PRIOR ART

STRUCTURE FOR PREVENTING FLAME OF ALTERNATOR FOR VEHICLE

BACKGROUND OF THE INVENTION

1. Field of the Invention

The present invention relates to a structure for preventing a flame of an alternator for a vehicle, and in particular to a structure for preventing a flame of an alternator for a vehicle which is capable of preventing a flame due to a spark from being moved to the outside and discharging dust formed due to a friction of a brush.

2. Description of the Background Art

Generally, an alternator(alternating current generator) for a vehicle is formed of a stator, a rotor and a diode, When an agitation switch is turned on, a current of a battery is applied to a rotor coil through a voltage regulator for thereby generating a magnetic force line. When an engine is started, and a rotor is rotated, a power is generated in the stator coil for thereby generating a 3-phase alternating current. The thusly generated 3-phase alternating current is rectified by the diode. When the voltage of the terminal B is higher than the voltage of the battery, the battery is charged, and the current is applied to each load.

As shown in FIG. 1, the alternator includes a driving shaft 2 provided in a front housing 1 sealed using a rear cover 4 and having a slip ring 3, and a brush assembly 5 installed at one side of the driving shaft 2. The brush assembly 5 includes a brush 6 contacting with the slip ring 3, a brush holder 7 for receiving the brush 6, and a sealing member 10 disposed between the front housing 1 and the rear cover 4 for sealing the brush holder 7.

The brush holder 7 includes an extended portion 7b. A flowing path K is formed toward an outlet hole 7a of the extended portion 7b and the rear cover 4 based on an inlet hole 10a, and a net-shaped wire net 20 is formed in the outlet hole 7a.

Therefore, an external air is flown to the inside of the front housing 1 based on the flowing path K formed by the brush holder 7 and the sealing member 10. A fine dust of the brush 6 formed due to a friction with the slip ring 3 based on the rotation of the driving shaft 2 is discharged toward the outlet hole 7a through the flowing path K.

In a state that a certain gas is fully filled in an engine room for a ship, a flame generated by a spark of the brush 6 and the slip ring 3 is blocked by the wire net 20 provided in the outlet hole 7a of the brush holder 7 for thereby preventing the flame from being charged to the outside. In addition, the flame is not transferred to the engine room filled with the gas. Since the flowing path K is formed by the brush holder 7 and the sealing member 10, in order to form the flowing path K, the structure of the brush holder 7 must be changed, so that the fabrication process is complicated, and the cost thereof is increased.

SUMMARY OF THE INVENTION

Accordingly, it is an object of the present invention to provide a structure for preventing a flame of an alternator for a vehicle which is capable of preventing an explosion due to the spark and a flame from being transferred to the engine room by forming the flowing path and discharging a fine dust of the brush without changing the structure of the brush assembly formed of a holder cap and a brush holder. Which are detachable.

In order to achieve the above object, there is provided a structure for preventing a flame of an alternator for a vehicle in which the brush assembly includes a brush holder receiving a brush and a holder cap detachably engaged to the brush holder, and a first flow way is formed in an upper portion of the brush holder and the holder cap for passing through the air flown through an inlet hole formed in a sealing member, and a second flow way is formed at a side portion of the brush holder and the holder cap in an alternator for a vehicle which is formed of a brush assembly having a brush contacting with a slip ring inserted onto one end of a driving shaft installed in a front housing and a sealing member provided at a lower portion of the brush assembly, a flame prevention structure for an alternator of a vehicle.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments of the present invention will be explained with reference to the accompanying drawings.

Figure 1:
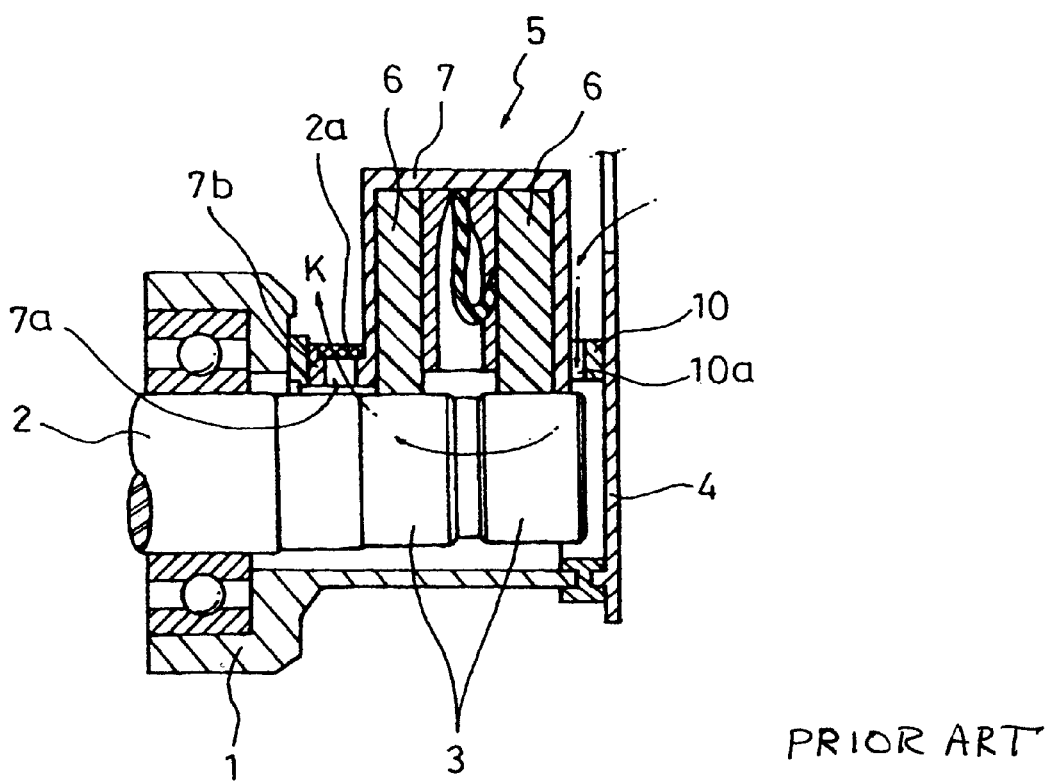
FIG. 1 is a cross-sectional view illustrating a vehicle alternator having a conventional flame preventing structure.
Figure 2:
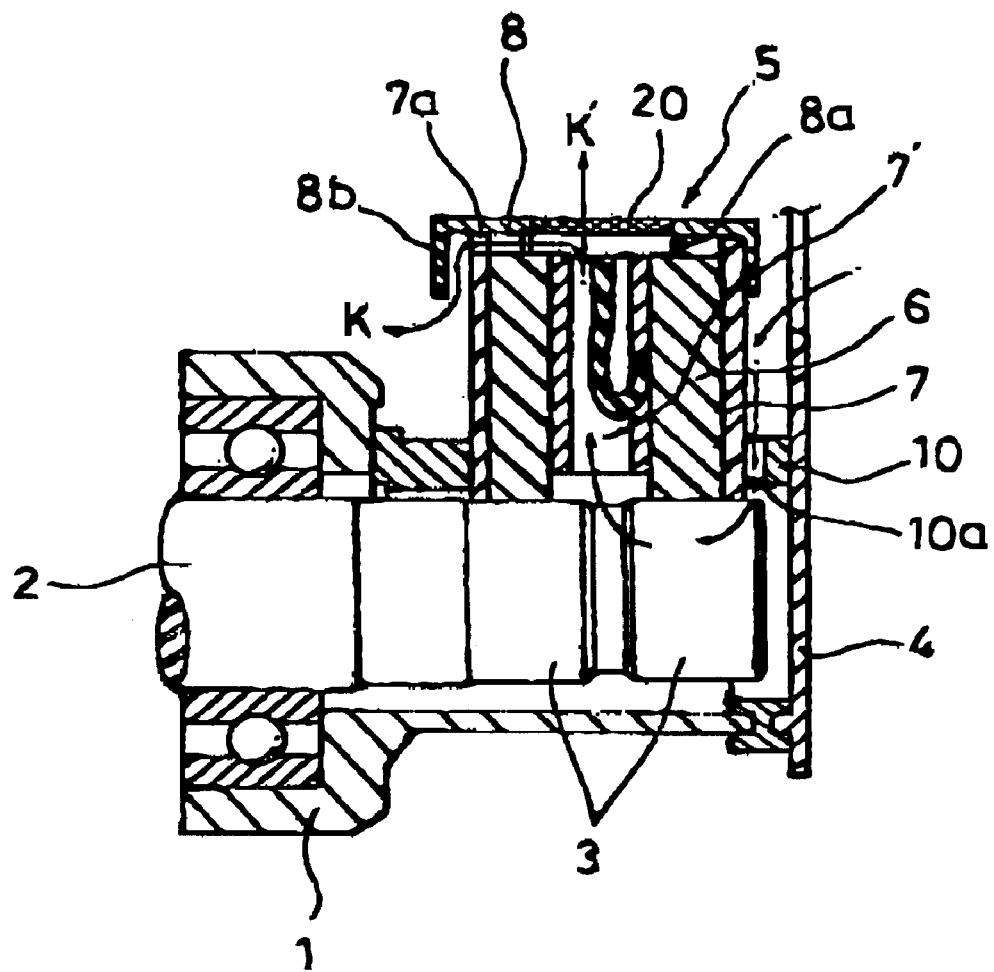
FIG. 2 is a cross-sectional view illustrating a vehicle alternator having a flame preventing structure according to the present invention.

FIG. 2 is a cross-sectional view illustrating an alternator for a vehicle having a flame prevention structure according to the present invention. A driving shaft 2 onto which a slip ring 3 is inserted is provided in a front housing 1 sealed by a rear cover 4. A brush assembly 5 is provided at one side of the driving shaft 2. A brush holder 7 of the brush assembly 5 is detachably engaged to the holder cap 8.

In addition, a sealing member 10 is disposed between the front housing 1 and the rear cover 4 for sealing a lower portion of the brush holder 7 and forms an inlet hole 10a in the direction of the rear cover 4.

Figure 3:
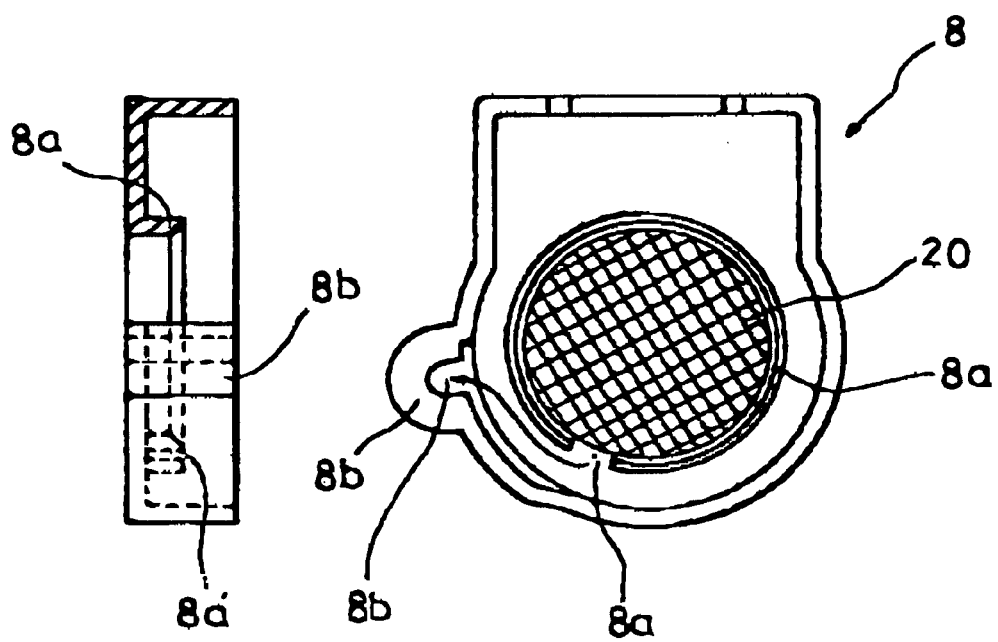
FIG. 3 is a cross-sectional view illustrating a holder cap which forms a discharge path according to the present invention.

As shown in FIG. 3, the holder cap 8 engaged to the upper portion of the brush holder 7 includes a net-shaped wire net 20, a protrusion flange 8a inwardly protruded, and a side portion 8b which is protruded in one side of a rim. The protrusion flange Ba guides a flow based on a cut groove 8a' formed by cutting a certain portion at a certain interval and a connection groove 8b' formed in the side portion 8b.

Namely, the externally inputted air is flown through a first flow way K' formed based on the inlet hole 10a of the sealing member 10, the center hole 7' of the brush holder 7 and the protrusion flange 8a of the holder cap 8, and a second flow way K formed based on the cut groove 8a' of the protrusion flange 8a which forms the first flow way K', the connection groove 8b' of the side portion 8b and the outlet hole 7a of the brush holder 7.

Therefore, a fine dust formed based on a contact with the slip ring 3 which is rotated together with the driving shaft 1 is flown into the intermediate hole 7' of the brush hole 7 together with the air flown through the inlet hole 10a of the sealing member 10 and is flown toward the inner side of the front housing through the holder cap 8 engaged to the upper portion of the b rush holder 7.

Namely, the air and the fine dust of the brush 6 are discharged through the first flow chart formed by the wire net 20 provided in the inlet hole 10a of the sealing member 10, the intermediate hole 7' of the brush holder 7 and the protrusion flange 8a of the holder cap 8. Even when an explosion and flame occur by a spark of the brush 6 and the slip ring 3, the explosion and flame are blocked by the wire net 20 provided in the protrusion flange 8a of the holder cap 8 for thereby preventing the explosion and flame from being transferred to the outside of the brush holder 7.

In addition, the brush assembly 5 includes a brush 6 contacting with the slip ring 3, a brush holder 7 which forms a center hole 7' not occupied by the brush 6 and having an outlet hole 7a, and a holder cap 8 engaged in such a manner that an upper portion of the brush holder 7 is sealed.

In addition, the air and fine dust which are not discharged through the first flow way K' are flown into the front housing 1 through the second flow way K, namely, are flown into the outlet hole 7a formed in the upper portion of the brush holder 7 through the cut groove 8a' of the protrusion flange 8a formed in the holder cap 8.

At this time, the air and dust discharged through the outlet hole 7a of the brush holder 7 are flown into the front housing I through the connection groove 8b' formed in the side portion 8b of the holder cap 8 which surrounds the outlet hole 7a.

As described above, in the present invention, the externally flown air and the fine dust of the brush are discharged through the first and second flow ways. The fine dust formed by a friction with the slip ring is effectively discharged. The gas explosion and flame which are caused by the spark are prevented in the brush assembly for thereby preventing the explosion and flame from being moved into the engine room in which a certain gas is filled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an alternator for a vehicle which is formed of a brush assembly having a brush contacting with a slip ring inserted onto one end of a driving shaft installed in a front housing and a sealing member provided at a lower portion of the brush assembly, a flame prevention structure for an alternator of a vehicle in which the brush assembly includes a brush holder receiving a brush and a holder cap detachably engaged to the brush holder, and a first flow way is formed in an upper portion of the brush holder and the holder cap for passing through the air flown through an inlet hole formed in a sealing member, and a second flow way is formed at a side portion of the brush holder and the holder cap.

2. The structure of claim 1, wherein said first flow way is formed through a center hole of the brush holder and a protrusion flange of the holder cap, and said second flow way is formed through a cut groove of the protrusion flange, a connection groove of the side portion and an outlet hole of the brush holder.

3. The structure of claim 2, wherein a net-shaped wire net is formed in the protrusion flange of the holder cap.

* * * * *